(No Model.)
F. F. LANDIS.
CROSS HEAD.
No. 512,554. Patented Jan. 9, 1894.
FIG_1_
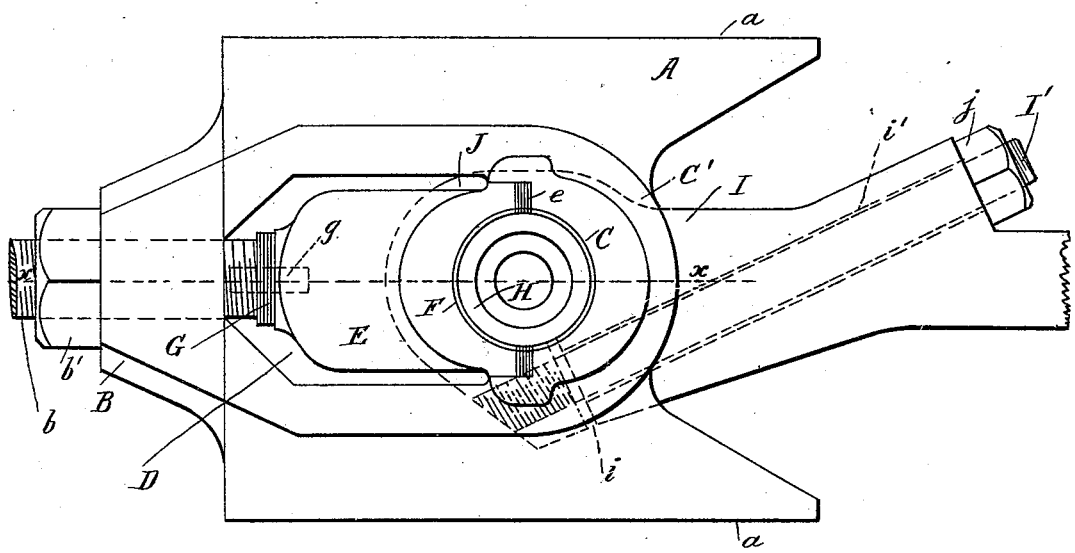
FIG_2_
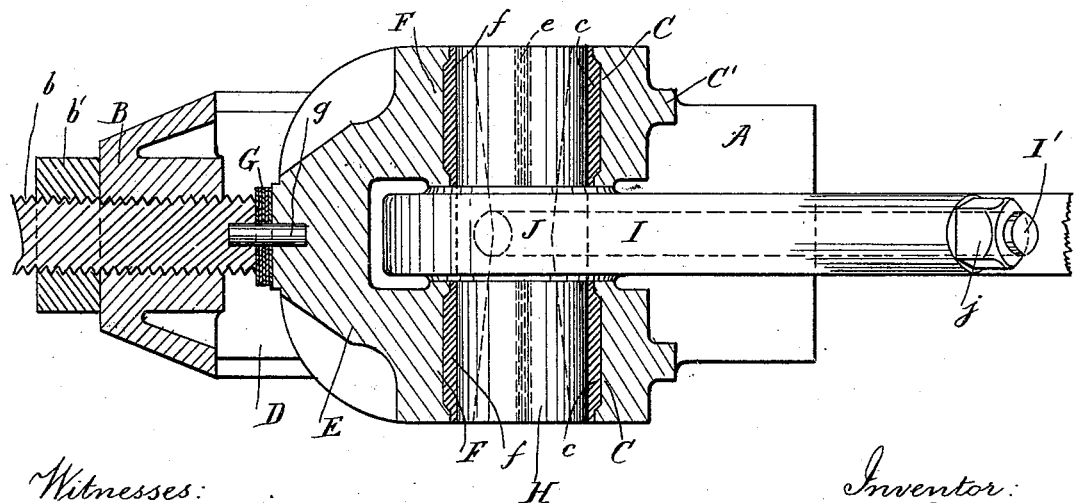
Witnesses:
Walter Allen
Thos E Robertson
Inventor:
Frank F. Landis
by Herbert W. T. Jenner.
Attorney

UNITED STATES PATENT OFFICE.

FRANK F. LANDIS, OF WAYNESBOROUGH, PENNSYLVANIA.

CROSS-HEAD.

SPECIFICATION forming part of Letters Patent No. 512,554, dated January 9, 1894.

Application filed May 25, 1893. Serial No. 475,444. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Cross-Heads; and I do hereby declare the following to be a full, clear, and exact description of the invention, such as will enable others skilled in the art to which it appertains to make and use the same.

This invention relates to crossheads for steam and other similar engines; and it consists in the novel construction and combination of the parts hereinafter fully described and claimed.

In the drawings: Figure 1 is a side view of the crosshead. Fig. 2 is a sectional plan view of the same, taken on the line $x\ x$ in Fig. 1.

A is the crosshead provided with bearing surfaces $a$ adapted to slide in the crosshead guides. These bearing surfaces are of any approved construction and may be formed on the crosshead as shown, or upon adjustable shoes, and they may be flat surfaces or circular arcs, or of any other approved form or construction.

B is a boss on the rear end of the crosshead. The end of the piston rod $b$ is screwed through this boss and secured by a jam nut $b'$.

C are semi-circular bearings in the forked front end C' of the crosshead. These bearings are preferably provided with Babbitt metal liners $c$.

D is a lateral hole formed through the body of the crosshead, behind the half bearings C.

E is a forked block provided with two semi-circular bearings F corresponding with the half bearings C and provided with Babbitt metal liners $f$. The block E is slid into the hole D, and $e$ are adjustable plates of thin metal interposed between the meeting ends of the half bearings.

G are thin adjusting plates interposed between the rear end of the block E and the end of the piston rod, and $g$ is a pin which passes through the said plates and has its ends let into holes in the said block and rod so that the plates cannot drop out.

H is the crosshead pin which is preferably a plain tube of metal cast in a chill and having its hardened outer surface accurately ground to fit the bearings of the crosshead.

I is the end of the connecting rod which is rigidly secured on the central portion of the pin H in any approved manner. For the purpose of securing the rod to the pin, the rod is preferably provided with an eye J of the same size as the pin. A slot $i$ is sawed through the metal at one side of the eye, and I' is a pin which is screwed in the metal at the one side of the slot. A hole $i'$ is formed diagonally through the rod for the pin I' to pass through, and $j$ is a nut screwed on the end of the pin and adapted to clamp the eye J upon the crosshead pin. The pin I' is passed diagonally through the connecting rod so that the nut $j$ may be located in a readily accessible position in front of the crosshead and on the upper side of the connecting rod.

The crosshead pin is made very hard and with very large bearing surfaces to avoid wear. When the crosshead bearings become worn, one or more of the thin plates $e$ are removed and the bearings are set up closer. This is effected by turning back the jam nut on the piston rod and screwing the end of the piston rod farther through the boss B. If the adjustment should be so great as to render the shortening of the piston rod objectionable, one or more additional plates G can be placed upon the pin $g$.

In a crosshead constructed in this manner it will be noticed that the thrust of the engine through the piston rod passes direct to the block E, and that the pressure is always upon one side of the screw-threads on the end of the piston rod. This prevents the piston rod from working loose as it enables the jam nut to hold it securely, which it could not do if the pressure were transferred from one side of the screw threads to the other at each stroke of the engine.

What I claim is—

1. A crosshead provided with a forked front end having two half bearings, and a lateral hole behind the bearings, an adjustable forked block slid in the said hole and also provided with two half bearings, and a screw threaded boss on the rear of the crosshead; in combination with a crosshead pin journaled in the said bearings, a connecting rod secured to the central portion of the crosshead pin between the bearings, and a piston rod screwed through the said boss and operating to hold the said block in position, substantially as set forth.

2. A crosshead provided with a forked front end having two half bearings and a lateral hole behind the bearings, an adjustable forked block slid in the said hole and also provided with two half bearings, and a screwthreaded boss on the rear of the crosshead; in combination with a piston rod screwed through the said boss and operating to hold the said block in position, the jam nut on the piston rod, the thin plates interposed between the end of the piston rod and the block, and a pin passing through holes in the said plates and having its ends let into holes in the said rod and block, substantially as set forth.

3. A crosshead provided with a forked front end having two half bearings, and a lateral hole behind the bearings, and a forked block slid in the said hole and provided with two half bearings; in combination with a crosshead pin journaled in the said bearings, means for holding the said block in position, a connecting rod provided with a slotted eye engaging the central portion of the said pin and a diagonally arranged hole, and a screwthreaded pin passing through the said hole and adapted to clamp the said eye on the crosshead pin, substantially as set forth.

In testimony whereof I affix my signature in presence of two witnesses.

FRANK F. LANDIS.

Witnesses:
HERBERT W. T. JENNER,
A. D. MORGANTHALL.